US008588988B2

(12) United States Patent
Jones et al.

(10) Patent No.: US 8,588,988 B2
(45) Date of Patent: Nov. 19, 2013

(54) METHOD AND APPARATUS FOR EXECUTING SECONDARY FUNCTIONS ON AN ELECTRICAL SWITCHGEAR DEVICE

(75) Inventors: Rhys Jones, Gwynedd (GB); Sean Christopher Ganley, Conwy (GB)

(73) Assignee: Eaton Industries Manufacturing GmbH (CH)

( * ) Notice: Subject to any disclaimer, the term of this patent is extended or adjusted under 35 U.S.C. 154(b) by 513 days.

(21) Appl. No.: 12/599,669

(22) PCT Filed: May 12, 2008

(86) PCT No.: PCT/GB2008/001637
§ 371 (c)(1),
(2), (4) Date: Nov. 10, 2009

(87) PCT Pub. No.: WO2008/139176
PCT Pub. Date: Nov. 20, 2008

(65) Prior Publication Data
US 2010/0305769 A1   Dec. 2, 2010

(30) Foreign Application Priority Data

May 11, 2007   (GB) .................................. 0709042.6

(51) Int. Cl.
*G05D 11/00*   (2006.01)
*H02H 3/08*   (2006.01)

(52) U.S. Cl.
USPC ......................................... 700/293; 361/93.3

(58) Field of Classification Search
USPC ........... 700/22, 292, 293, 296, 297; 361/93.3, 361/93.5, 93.6, 605, 635, 664
See application file for complete search history.

(56) References Cited

U.S. PATENT DOCUMENTS

| | | | | |
|---|---|---|---|---|
| 5,359,711 | A * | 10/1994 | Hartmann et al. | 715/202 |
| 6,292,717 | B1 * | 9/2001 | Alexander et al. | 700/293 |
| 6,678,135 | B2 * | 1/2004 | Tignor et al. | 361/93.3 |
| 6,813,525 | B2 * | 11/2004 | Reid et al. | 700/19 |
| 6,999,291 | B2 * | 2/2006 | Andarawis et al. | 361/64 |
| 7,630,186 | B2 * | 12/2009 | Reynolds et al. | 361/93.1 |
| 7,672,104 | B2 * | 3/2010 | Reynolds et al. | 361/93.1 |

(Continued)

FOREIGN PATENT DOCUMENTS

| | | |
|---|---|---|
| EP | 0 774 768 A1 | 5/1997 |
| EP | 1 294 068 A2 | 3/2003 |
| WO | WO 2008/139176 A1 | 11/2008 |

OTHER PUBLICATIONS

Eaton Industries Manufacturing GmbH, EP 08 750 571.5, Examination Report from European Patent Office mailed Sep. 21, 2011, 4 pages.
Deepstream Technologies Limited, PCT/GB2008/001637 "Written Opinion of the International Searching Authority" dated Nov. 17, 2009.

(Continued)

*Primary Examiner* — Dave Robertson
(74) *Attorney, Agent, or Firm* — McKee, Voorhees & Sease, P.L.C.

(57) ABSTRACT

This invention relates to a method and apparatus for executing secondary functions on an electrical switchgear device. In particular, the present invention relates to a method and apparatus which is implemented in the processing electronics of an electrical switchgear device which has a primary trip or protection function and also the capability to execute secondary functions or applications, such as over/undervoltage conditions and near fault warning levels and display. These secondary functions or applications being user configurable and are subject to processing availability and the constraints of the primary protection function.

26 Claims, 3 Drawing Sheets

(56) References Cited

U.S. PATENT DOCUMENTS

| | | | |
|---|---|---|---|
| 7,991,826 B1 * | 8/2011 | Colonna et al. | 709/203 |
| 2006/0192663 A1 * | 8/2006 | Bryan et al. | 340/457.1 |
| 2010/0214109 A1 * | 8/2010 | Reynolds et al. | 340/664 |

OTHER PUBLICATIONS

Deepstream Technologies Limited, PCT/GB2008/001637 "International Preliminary Report on Patentability" dated Nov. 17, 2009.

Eaton Industries Manufacturing GmbH, Application No. 08 750 571.5—1808, Intent to Grant dated Feb. 12, 2013.

* cited by examiner

METHOD AND APPARATUS FOR EXECUTING SECONDARY FUNCTIONS ON AN ELECTRICAL SWITCHGEAR DEVICE

This invention relates to a method and apparatus for executing secondary functions on an electrical switchgear device. In particular, the present invention relates to a method and apparatus which is implemented in the processing electronics of an electrical switchgear device which has a primary trip or protection function and also the capability to execute secondary functions or applications, such as over/undervoltage conditions and near fault warning levels and display. These secondary functions or applications being user configurable and are subject to processing availability and the constraints of the primary protection function.

All prior art electrical switchgear devices, whether circuit protection (i.e., circuit breakers or residual current devices), circuit monitoring or circuit switching devices have a primary function, and in some cases other secondary protection or monitoring functions. However, this functionality is hardwired into the device and offers few possibilities to customise the basic operation and no chance to add functionality without additional accessory devices.

To overcome these limitations in the prior art, it is the object of the present invention to provide a method and apparatus for executing secondary functions on an electrical switchgear device. The method and apparatus enabling the electrical switchgear device to at all times perform its primary protection function. The present invention however allows for user configurable secondary functions or applications to be written in a high level macro language, downloaded to the switchgear device and then interpreted in real-time to perform some further secondary functionality in addition to the primary function of the switchgear device. In this way, different users can customise the behaviour of the switchgear device and add custom functionality without the intervention of the manufacturer. The present invention provides for a much-increased functionality of the switchgear device, with no additional accessory or hardware costs.

According to the present invention there is provided a method of executing user configurable secondary functions on an electrical switchgear device connecting an electric supply to an electrical installation, the electrical switchgear device comprising a microprocessor for receiving at least one stimulus and executing at least one primary function dependent upon said at least one stimulus, the method comprising the steps of:

storing a plurality of secondary functions in said microprocessor, each of said secondary functions having a user configurable priority assigned thereto; and sequentially executing said secondary functions based upon said at least one stimulus and said user configurable priority.

Also according to the present invention there is provided an apparatus for executing user configurable secondary functions on an electrical switchgear device connecting an electric supply to an electrical installation, the electrical switchgear device comprising a microprocessor for receiving at least one stimulus and executing at least one primary function dependent upon said at least one stimulus, comprising:

means for storing a plurality of secondary functions in said microprocessor, each of said secondary functions having a user configurable priority assigned thereto; and means for sequentially executing said secondary functions based upon said at least one stimulus and said user configurable priority.

Further according to the present invention there is provided a computer program product for executing user configurable secondary functions on an electrical switchgear device connecting an electric supply to an electrical installation, the electrical switchgear device comprising a microprocessor for receiving at least one stimulus and executing at least one primary function dependent upon said at least one stimulus, comprising:

computer program product means for storing a plurality of secondary functions in said microprocessor, each of said secondary functions having a user configurable priority assigned thereto; and computer program product means for sequentially executing said secondary functions based upon said at least one stimulus and said user configurable priority.

In a preferred embodiment, the electrical switchgear device may be a circuit protection device, and more particularly a circuit breaker or residual current device, or a circuit monitoring or circuit switching device. Preferably, the step of executing at least one primary function dependent upon said at least one stimulus comprises disconnecting the electric supply to the electrical installation.

Preferably, said at least one stimulus is selected from a group consisting of: overcurrent, residual current, overvoltage, undervoltage, ambient temperature, device temperature. Said at least one stimulus being digitally encoded and inputted to said microprocessor. Said at least one stimulus may also be generated internally by the operating system in said microprocessor and can include any one of the following input signals: timer overflow/interrupt, calculation output, input port, exception event, serial port interrupt, comparator input.

In one embodiment, said at least one stimulus is obtained from a current sensor measuring the total current in the phase conductor of said electric supply and said at least one primary function executes if said current flowing exceeds a predetermined threshold level.

Further preferably, said plurality of said secondary functions are related to less safety critical applications and more to the display and warning of near trip conditions. With an appropriate input from said at least one stimulus any one of said plurality of said secondary functions can be used, for example, to calculate power consumption, detect undervoltage, determine the power factor, or re-rate the device in high ambient temperatures.

Preferably, the step of storing a plurality of secondary functions in said microprocessor further comprises the steps of programming said secondary function in a high level macro language and downloading said secondary function to the electrical switchgear device.

Further preferably, the step of programming said secondary function in a high level macro language is achieved using a programming tool that may also incorporate a simulator to demonstrate the function sequence. In use, the secondary function can then be uploaded or downloaded to the switchgear device and stored to permanent storage on a host computer.

Likewise according to the present invention there is provided a method of executing user configurable secondary functions on an electrical switchgear device connecting an electric supply to an electrical installation, the electrical switchgear device comprising a circuit protection arrangement having a hardwired primary function dependent upon at least one stimulus and a microprocessor, the method comprising the steps of:

storing a plurality of secondary functions in said microprocessor, each of said secondary functions having a user configurable priority assigned thereto; and sequentially executing said secondary functions based upon said at least one stimulus and said user configurable priority.

Similarly according to the present invention there is provided an apparatus for executing user configurable secondary functions on an electrical switchgear device connecting an electric supply to an electrical installation, the electrical switchgear device comprising a circuit protection arrangement having a hardwired primary function dependent upon at least one stimulus and a microprocessor, comprising:

means for storing a plurality of secondary functions in said microprocessor, each of said secondary functions having a user configurable priority assigned thereto; and means for sequentially executing said secondary functions based upon said at least one stimulus and said user configurable priority.

Moreover according to the present invention there is provided a computer program product for executing user configurable secondary functions on an electrical switchgear device connecting an electric supply to an electrical installation, the electrical switchgear device comprising a circuit protection arrangement having a hardwired primary function dependent upon at least one stimulus and a microprocessor, comprising:

computer program product means for storing a plurality of secondary functions in said microprocessor, each of said secondary functions having a user configurable priority assigned thereto; and computer program product means for sequentially executing said secondary functions based upon said at least one stimulus and said user configurable priority.

It is believed that a method and apparatus in accordance with the present invention at least addresses the problems outlined above. The advantages of the present invention are that a method and apparatus for executing secondary functions on an electrical switchgear device is provided. The method and apparatus enabling the electrical switchgear device to at all times perform its primary protection function. Advantageously, the present invention allows for user configurable secondary functions or applications to be written in a high level macro language, downloaded to the switchgear device and then interpreted in real-time to perform some secondary functionality in addition to the primary function of the switchgear device. In this way, different users can customise the behaviour of the switchgear device and add custom functionality without the intervention of the manufacturer. Further advantageously, the present invention provides for a much-increased functionality of the switchgear device, with no additional accessory or hardware costs.

It will be obvious to those skilled in the art that variations of the present invention are possible and it is intended that the present invention may be used other than as specifically described herein.

A specific non-limiting embodiment of the invention will now be described by way of example and with reference to the accompanying drawings, in which.

Figure 1:
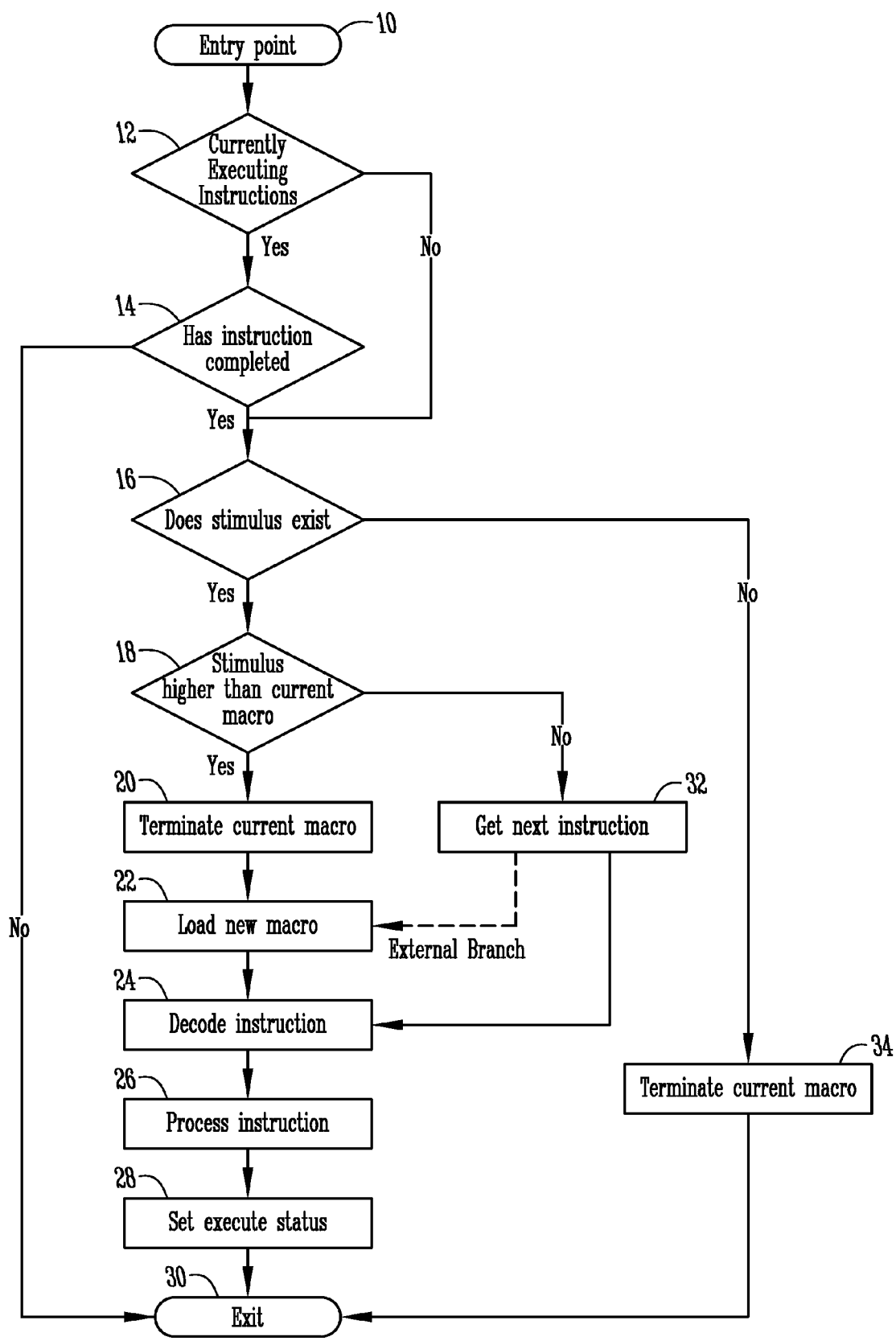
FIG. 1 illustrates a flow diagram showing how secondary functions or applications are executed on the switchgear device depending upon the priority assigned to them.

Referring now to the drawings, the method and apparatus according to the present invention has been developed for incorporation into any type of electrical switchgear device, whether circuit protection (i.e., circuit breakers or residual current devices), circuit monitoring or circuit switching devices which generally perform a primary function of disconnecting an electric supply to an electrical installation upon detection of some predetermined fault condition. The skilled person will appreciate that such electrical switchgear devices generally include some form of current and/or voltage detector measuring at least one parameter of the electric supply and/or electrical installation and a circuit protection arrangement, which can sometimes form part of a microprocessor-controlled tripping device, to perform the primary function. The present invention enabling user configurable secondary functions or applications, such as over/undervoltage conditions and near fault warnings, monitoring and display, to be executed without affecting the primary function of the device.

To allow for these user configurable secondary functions or applications to be written in a high level macro language, downloaded to the switchgear device and then interpreted in real-time to perform some further secondary functionality in addition to the primary function of the switchgear device, the present invention makes use of an interpreter that executes the secondary applications written in a high level macro language on an off line editor. Further details on each aspect of the present invention are described below:

The Interpreter

The function of the interpreter is to decode the statements written in a high level macro language, evaluate the statements and execute the instruction subject to the resource availability and the constraints of the primary protection function. The interpreter has additional enhancements:

Individual macro applications can be assigned to events or stimulus generated from the operating system.

A macro application can be launched either by a user request or called from another macro application.

Macro applications can be assigned a priority, which determines their execution order.

The interpreter is a task run and managed by the device's operating system on a periodic basis. Each time the interpreter is run it performs all it's processing within a given time window.

The interpreter operates in two distinct phases, namely Start up and Periodic.

At Start up, the interpreter initialises itself then analyses the macro applications to determine, which stimuli they are associated with and assigns a priority to each macro application.

The stimuli are predetermined inputs to the interpreter and are directly connected to either the device's hardware or to the device's application software. Examples of such stimuli are given below in Table 1.

TABLE 1

| Hardware | Application |
|---|---|
| Timer overflow/interrupt | Calculation output |
| Input port | Exception event |
| Serial port interrupt | |
| Comparator input | |

The stimuli are validated using a conditioning statement. Association of stimuli to secondary macro applications is managed through a vector table which records for each stimulus which macro application should be run and what the priority should be, examples of which are shown in Table 2.

TABLE 2

| Macro Application | Priority | Stimulus |
|---|---|---|
| Overvoltage warning | 4 | V1 |
| Undervoltage trip | 5 | V1 |
| Auxiliary relay open | 7 | R1 |
| Auxiliary relay close | 7 | R2 |
| 1 second timer | 6 | T2 |
| Over current Level 1 | 1 | IA |
| Over current Level 2 | 2 | IA |
| Over current Level 3 | 3 | IA |

Table 2 shows the construction of the vector table. The priority data is contained within a table, which is managed by the operating system.

There can be as multiple levels of priority and stimuli can share the same level of priority and then arbitration is based on a first come first served basis. If a secondary macro application is currently executing and a stimulus of the same priority occurs, the currently executing secondary application has to terminate before the new macro application can start. If the stimulus is removed during the execution of the macro application then the application terminates at the next time an instruction is processed (periodic interval).

When the interpreter is run at periodic intervals it performs the following actions, which are shown in more detail in FIG. 1:

Determines if any command is currently being executed 12, 14
Determine what stimulus is active 16
Decide which has highest priority 18, and branch to that macro application 20, 22
Evaluate the next instruction 24, 26
Execute statement 28
Exit 30

As shown in FIG. 1, the interpreter can perform two basic types of branch instruction, namely internal and external branches. Internal branches may be conditional, and the branch to point can only be within the macro application.

External branches 32 transfer program execution to a 2nd macro application. When the $2^{nd}$ macro application terminates, the interpreter returns to the $1^{st}$ macro application at the next instruction.

The same rules regarding priority are in effect. If another stimuli of a higher priority occur this takes precedence and the both the $1^{st}$ and $2^{nd}$ macro applications are terminated 34. The $2^{nd}$ application inherits its priority from the $1^{st}$, i.e. application 1 has priority 4 while the $2^{nd}$ application has priority 3. For the duration of the branch, the $2^{nd}$ application will inherit priority 4. Recursive branching is not allowed and only one level of external branch is permitted.

The Macro Language

The macro language is a list of statements which is used to describe an operation or process. The language consists of:
logical operators
Conditional branches
Branches, and
Input/Output commands In the context of a circuit protection and monitoring device, the input and output commands are associated with measured data, control and programme registers, relays and external hardware linkages and visible indicators. Branches can be used to move to a different execution point in the application of to a new application. Logical operators are either evaluation statements, e.g. =, <, or >, or Boolean operations AND, OR, EOR, NAND etc.

The Application

A macro application is a collection of statements 56 which are executed by the interpreter. Each statement consists of an instruction 58 and its associated parameters 60.

The Off Line Editor

This is an application hosted on a personal computer or mobile device which can be used to create and edit the macro statement in an application. Once the events and sequences are prepared they are transferred to the device either by a communications network of by downloading directly by attaching a programming device.

Figure 2:
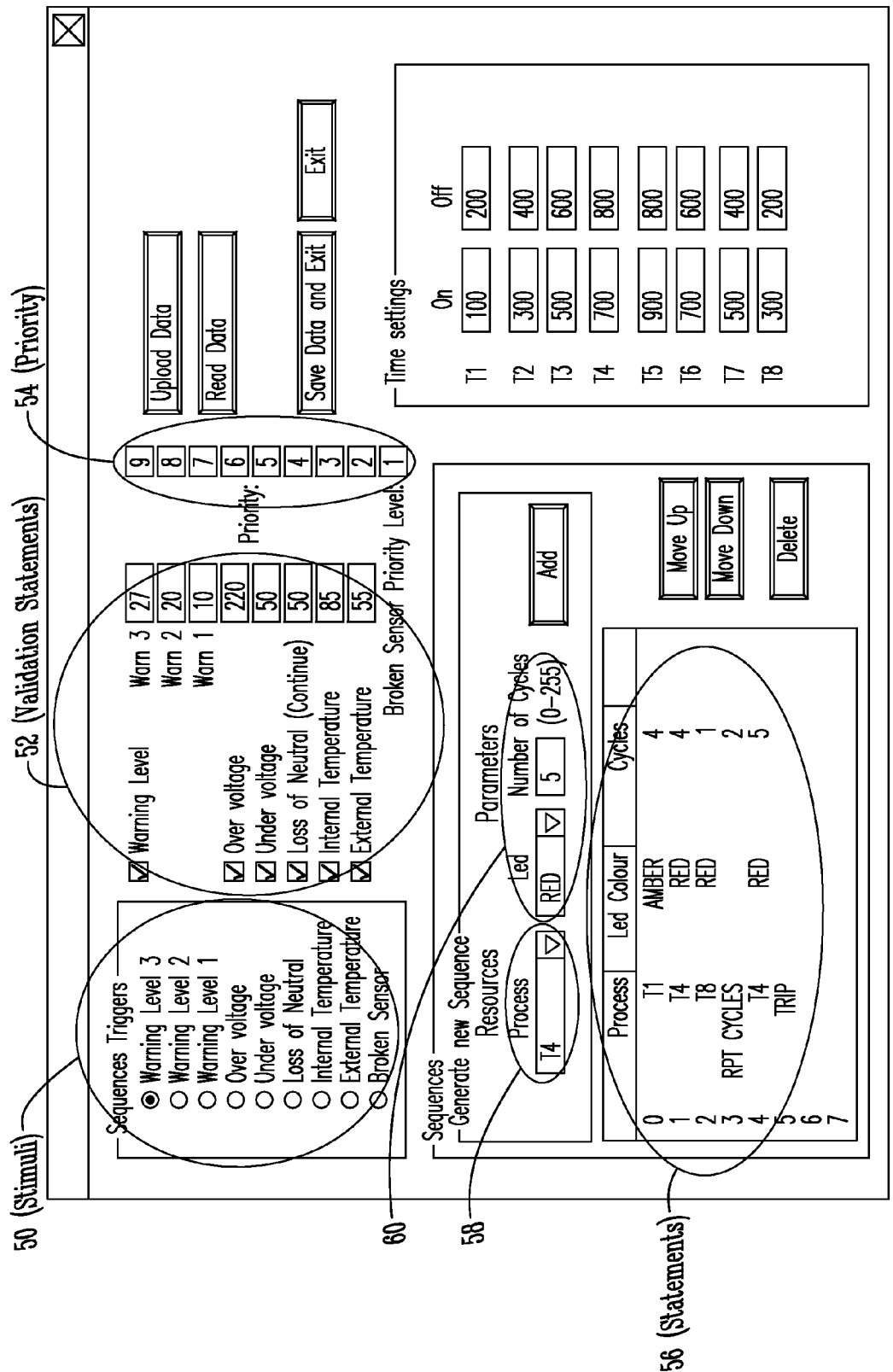
FIG. 2 shows the implementation of an off-line graphical user interface is operable by a user to input secondary functions or applications, and which are then subsequently downloaded to the switchgear device in accordance with the present invention.

The programming tool presents the events and sequences in a human readable manner. FIG. 2 is an example of such a programming interface.

As previously discussed all available event stimuli are listed, these can be enabled and validation conditions 52 applied. Priority levels 54 are associated with each event. For example, as shown in FIG. 2, warning level 3 is enabled with a test level of 27 mA and a priority of 9.

The sequence for this event is shown in the bottom left section of FIG. 2 and it defines that the display associated with the switchgear device defines 4 amber flashes, 4 red flashes a single short red flash, the cycle is repeated once then followed by 5 red flashes and the device will then trip.

In is also envisaged that the programming tool may also incorporate a simulator to demonstrate the event sequence. In use, the sequences can then be uploaded or downloaded to the switchgear device and stored to permanent storage on the host computer.

In order to demonstrate how the present invention can be implemented in a tangible switchgear device, the implementation of such in a circuit breaker is now described. The skilled person will appreciate that such a device generally comprises a fixed and moving contact that is used to isolate a load circuit from an electric supply. The circuit breaker incorporating at least one sensor to measure the parameters of the electrical supply and some evaluation circuit to determine what action is required. Typically this would be a current sensor to measure total current in a phase conductor and evaluation electronics to determine if the current flowing exceeds a predetermined fault threshold. In this case, the primary function of the device is to open the contacts in response to the predetermined fault condition.

As described above, the evaluation electronics is also capable of running user defined secondary macro applications, and the skilled person will appreciate that these could be to display appropriate warning signals as the current approaches the threshold level, and when it exceeds the level.

With appropriately-connected voltage and temperature sensors it would also be possible to develop a custom macro application to:
Calculate power consumption
Detect undervoltage
Determine the power factor
De-rate the device in high ambient temperatures
Of course, other applications would be possible, and these could be determined either by the device manufacturer or by an installer. The applications would be developed and tested on a remote computer and downloaded to the circuit breaker.

Figure 3:
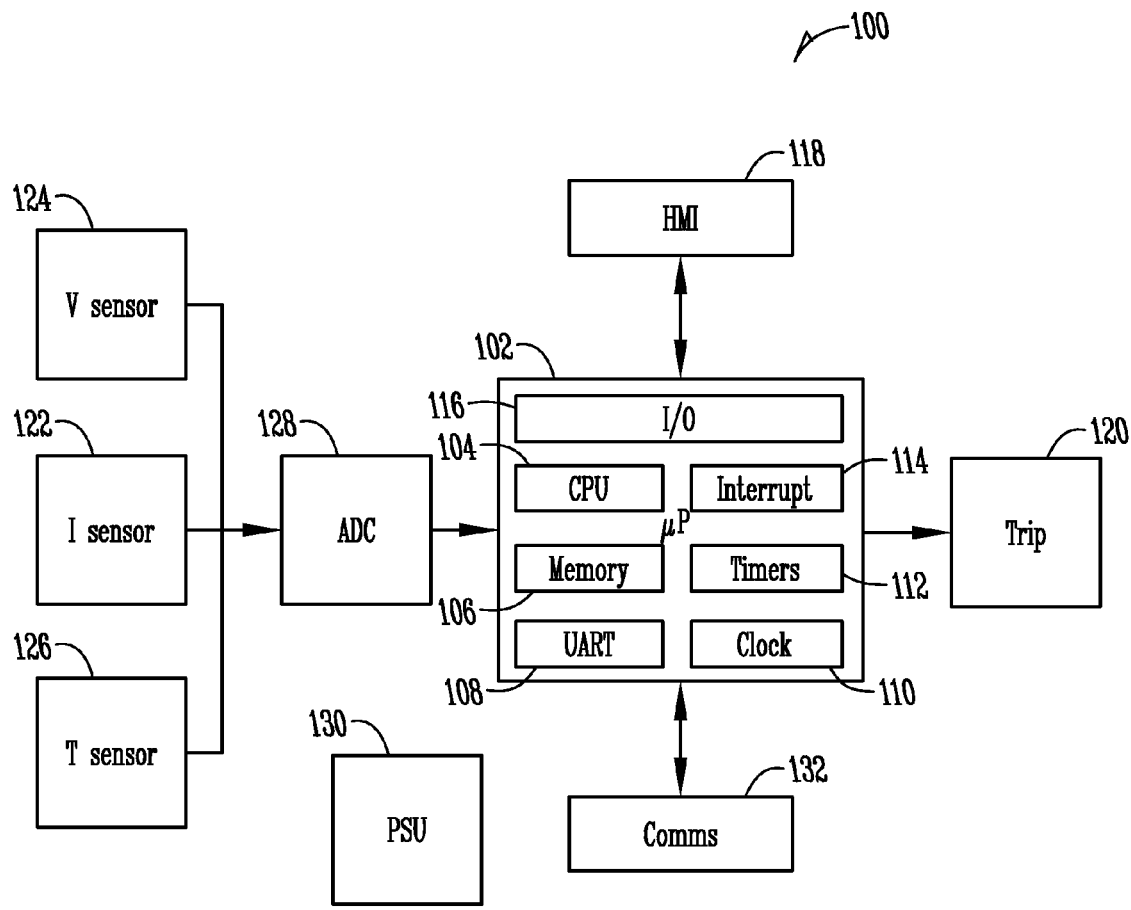
FIG. 3 is a schematic diagram showing a microprocessor architecture in accordance with the present invention.

FIG. 3 shows the architecture of a typical microcontroller-based platform 100 on which the interpreter 114, as described above, can run secondary macro applications. The microprocessor 102 typically contains a central processing unit 104, memory 106, UART 108, clock 110, timers 112 and peripherals. The interrupt logic 114 orders peripheral access to the central processor 104 and in turn to the interpreter. In the example shown in FIG. 3, a number of sensors are used to detect current I 122, voltage V 124 and temperature T 126, the resulting signal is multiplexed into an analogue to digital converter 128 and the subsequent digital representation is sent to the CPU 104 for processing.

The HMI (Human Machine Interface) 118 can range from a simple button and indicator to a more complex display (Liquid Crystal display) and a touch sensitive keyboard matrix that may be overlaid on the display.

FIG. 3 also shows that the microcontroller-based platform 100 is fed from a power supply unit 130, and is also connected to trip circuitry 120 for executing the primary trip function, as described above.

The skilled person will appreciate that the present invention can also be implemented in an electrical switchgear device that includes a circuit protection arrangement having a hardwired primary protection function operable upon detection of some predetermined fault condition and also a microprocessor-controlled secondary arrangement running secondary functions which are related to less safety critical applications.

Various alterations and modifications may be made to the present invention without departing from the scope of the invention. For example, although particular embodiments refer to implementing the present invention on a single phase electrical installation, this is in no way intended to be limiting as, in use, the present invention can be incorporated into larger installations, both single and multi-phase.

The invention claimed is:

1. A method of executing a user configurable secondary function on an electrical switchgear circuit protection device connecting an electric supply to an electrical installation, the electrical switchgear device comprising a microprocessor for receiving at least one stimulus and executing at least one primary circuit breaker function dependent upon said at least one stimulus, the method comprising:
    interpreting a secondary function programmed in high-level language statements in real time, the secondary function being related to the display or warning of any one or more of: power consumption, power factor, rating, ambient temperature, device temperature, overvoltage conditions, undervoltage conditions and near trip conditions, and being in addition to the primary circuit breaker function of the device;
    assigned a user configurable priority to the or each secondary function; and
    sequentially executing the secondary functions based upon said at least one stimulus and said user configurable priority, without affecting the primary function of the device.

2. The method of claim 1, wherein executing the at least one primary function comprises disconnecting said electric supply to said electrical installation.

3. The method of claim 1, wherein said at least one stimulus is at least one of an overcurrent, a residual current, an overvoltage, an undervoltage, an ambient temperature, and a device temperature.

4. The method of claim 1, wherein said at least one stimulus is digitally encoded and inputted to said microprocessor.

5. The method of claim 4, wherein said at least one stimulus is generated internally by an operating system in said microprocessor and includes any one of the following input signals: a timer overflow/interrupt, a calculation output, an input from an input port, an exception event, a serial port interrupt, and a comparator input.

6. The method of claim 1, wherein said at least one stimulus is obtained from a current sensor measuring the total current in the phase conductor of said electric supply and said at least one primary function executes if said current flowing exceeds a predetermined threshold level.

7. The method of claim 1, wherein the secondary function calculates any one of the following: a power consumption, an undervoltage, and a power factor.

8. The method of claim 1, further comprising programming the secondary function in a high level macro language; and downloading the secondary function to the electrical switchgear device.

9. The method of claim 8, wherein programming the secondary function in a high level macro language comprises using a programming tool that also incorporates a simulator to demonstrate the function sequence.

10. The method of claim 1, wherein the secondary function is uploaded or downloaded to the switchgear device and stored in permanent storage on a host computer.

11. The method of claim 1 wherein the primary function is hardwired into the switchgear device.

12. An apparatus for executing a user configurable secondary function on a circuit protection electrical switchgear device connecting an electric supply to an electrical installation, the electrical switchgear circuit protection device comprising:
    a microprocessor for receiving at least one stimulus and executing at least one primary circuit breaker function dependent upon said at least one stimulus;
    an interpreter for interpreting each of a plurality of secondary functions programmed in high-level language statements and being related to the display or warning of any one or more of: power consumption, power factor, rating, ambient temperature, device temperature, overvoltage conditions, undervoltage conditions and near trip conditions in real time, each secondary function having a user configurable priority assigned thereto and each secondary function being in addition to the primary function of the device;
    wherein the device is operable to sequentially execute said secondary functions based upon said at least one stimulus and said user configurable priority, without affecting the primary function of the device.

13. The apparatus of claim 12, wherein said microprocessor for receiving at least one stimulus and executing at least one primary function further comprises means for disconnecting said electric supply to said electrical installation.

14. The apparatus of claim 12, wherein said at least one stimulus is any one of the following: an overcurrent, a residual current, an overvoltage, an undervoltage, an ambient temperature, and a device temperature.

15. The apparatus of claim 12, wherein said at least one stimulus is digitally encoded and inputted to said microprocessor.

16. The apparatus of claim 15, wherein said at least one stimulus is generated internally by an operating system in said microprocessor and includes any one of the following input signals: a timer overflow/interrupt, a calculation output, an input from an input port, an exception event, a serial port interrupt, and a comparator input.

17. The apparatus of claim 12, wherein said at least one stimulus is obtained from a current sensor measuring the total current in the phase conductor of said electric supply and said at least one primary function executes if said current flowing exceeds a predetermined threshold level.

18. The apparatus of claim 12, wherein any one of said plurality of said secondary functions comprises an input and is operable to calculate any one of the following: a power consumption, an undervoltage, or a power factor.

19. The apparatus of claim 12, wherein the apparatus further comprises means for programming said secondary function in a high level macro language and means for downloading said secondary function to the electrical switchgear device.

20. The apparatus of claim 19, wherein said means for programming said secondary function in a high level macro language comprises a programming tool that also incorporates a simulator to demonstrate the function sequence.

21. The apparatus of claim 12, wherein the secondary function is uploaded or downloaded to the switchgear device and stored in permanent storage on a host computer.

22. The apparatus of claim 12 wherein the primary function is hardwired into the switchgear device.

23. A storage medium having a computer program stored thereon for executing user configurable secondary function on an electrical switchgear circuit protection device connecting an electric supply to an electrical installation, the electrical switchgear circuit protection device comprising a microprocessor for receiving at least one stimulus and executing at least one primary circuit breaker function dependent upon said at least one stimulus, the computer program being operable to interpret in real-time a plurality of secondary functions, each secondary function having user configurable primary assigned thereto and being related to the display or warning of any one or more of: power consumption, power factor, rating, ambient temperature, device temperature, overvoltage conditions, undervoltage conditions and near trip conditions, each programmed in high-level language statements and each being in addition to the primary function of the device, and to sequentially execute the secondary functions based upon said at least one stimulus and said user configurable priority, without affecting the primary function of the device.

24. An apparatus for executing user configurable secondary functions on an electrical switchgear circuit protection device connecting an electric supply to an electrical installation, the electrical switchgear circuit protection device comprising a microprocessor for receiving at least one stimulus and executing at least one primary circuit breaker function dependent upon said at least one stimulus, comprising:

an interpreter operable with the microprocessor for interpreting each of a plurality of secondary functions in said microprocessor programmed in high-level language statements and being related to the display or warning of any one or more of: power consumption, power factor, rating, ambient temperature, device temperature, overvoltage conditions, undervoltage conditions and near trip conditions in real-time, each secondary function having a user configurable priority assigned thereto and each secondary function being in addition to the primary function of the device;

wherein the device is operable to sequentially execute said secondary functions based upon said at least one stimulus and said user configurable priority, without affecting the primary function of the device.

25. The apparatus of claim 24 wherein the component to store comprises an interpreter.

26. The apparatus of claim 24 wherein the component to sequentially execute comprises an interpreter.

* * * * *